United States Patent Office  
3,401,176  
Patented Sept. 10, 1968

3,401,176
4-ALKOXY OR AMINOALKOXY-5-PHENYL-3-PYRROLIN-2-ONES AND THEIR PREPARATION
Corris Mabelle Hofmann, Ho-Ho-Kus, and Sidney Robert Safir, River Edge, N.J., assignors to American Cyanamid Company, Stamford, Conn., a corporation of Maine
No Drawing. Filed July 27, 1965, Ser. No. 475,250
11 Claims. (Cl. 260—326.5)

ABSTRACT OF THE DISCLOSURE

The preparation of 4-lower alkoxy or di(lower)-alkylamino(lower)alkoxy-5-phenyl-3-pyrrolin-2-ones wherein the phenyl group may be substituted, is described. These compounds are prepared from 2-amino-2-phenyl or substituted phenyl alkanamides by reaction with acetyl chloride or α-alkylacetoacetic ester and subsequent cyclization to produce the substituted pyrrolin-2-ones of the invention. These compounds are central nervous system depressants useful as hypnotics or tranquilizers.

---

This invention relates to new organic compounds. More particularly it relates to 4-alkoxy-5-phenyl-3-pyrrolin-2-ones and their preparation.

The novel compounds of the present invention may be illustrated by the following formula:

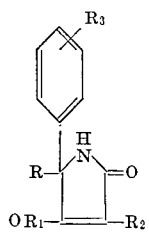

wherein R and $R_2$ are selected from the group consisting of hydrogen and lower alkyl, and $R_1$ is selected from the group consisting of lower alkyl and di(lower)alkylamino(lower)alkyl; $R_3$ is selected from the group consisting of hydrogen, lower alkoxy, lower alkyl, trifluoromethyl and halo. Suitable lower alkyl substituents are methyl, ethyl, propyl, butyl, isopropyl or isobutyl. Similarly lower alkoxy groups suitable are methoxy, ethoxy, propoxy, butoxy, isopropoxy or isobutoxy. Halogen atoms such as chlorine, bromine, fluorine or iodine may be present.

The compounds of the present invention are crystalline solids, soluble in organic solvents, such as acetone and alcohol, and insoluble in water and/or mineral acids.

The compounds of this invention in which $R_2$ is hydrogen are prepared by reacting a 2-amino-2-phenyl- (or substituted phenyl)-alkanamide with acetyl chloride in an inert solvent such as, for example, ether, acetone, or benzene in the presence of an alkaline agent, for example, triethylamine. The resulting 2-acetamido-2-phenyl-(or substituted phenyl)alkanamides are then treated with polyphosphoric or sulfuric acid at temperatures of 50°–100° C. followed by treatment with an alcohol such as methanol or ethanol to give the corresponding 2-acetamido-2-phenyl-(or substituted phenyl)alkanoic esters. The resulting esters are cyclized with an alkali metal hydride, for example, sodium hydride in toluene, or an alcoholic alkali metal alkoxide, for example, sodium ethoxide in ethanol at temperatures within the range of 50°–125° C. The resulting 5-phenyl-(or substituted phenyl)-pyrrolidine-2,4-diones may be alkylated with an alkyl halide, such as methyl iodide, ethyl bromide, or an alkyl sulfate, such as dimethyl sulfate, in a suitable solvent, as for example, methanol, in the presence of one equivalent of an alkali metal alkoxide, such as sodium methoxide.

This series of reactions can be illustrated as follows:

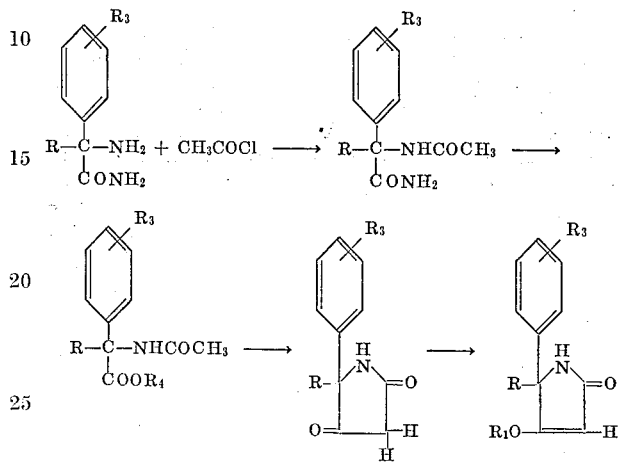

wherein R is hydrogen or lower alkyl and $R_1$ and $R_4$ are lower alkyl and $R_3$ is as heretofore defined.

The compounds of this invention in which $R_2$ is lower alkyl are prepared by reacting a 2-amino-2-phenyl(or substituted phenyl)alkanamide with an α-alkylacetoacetic ester in an inert solvent such as toluene, xylene, or mesitylene at temperatures of 80°–160°C. The resulting 2-(α-alkylacetoacetamido)-2-phenyl-(or substituted phenyl)alkan amides are treated with polyphosphoric or sulfuric acid at temperatures of 50°–100° C. for 15 minutes to 2 hours followed by treatment with an alcohol, such as methanol or ethanol, to give the corresponding 2-(α-alkylacetoacetamido)-2-phenyl-(or substituted phenyl)alkanoic esters. The resulting esters are cyclized with an aqueous alkali metal hydroxide, such as sodium hydroxide or with an alcoholic alkali metal alkoxide, such as sodium methoxide in methanol at temperatures of 50°–100° C. The resulting 3-lower alkyl-5-phenyl-(or substituted phenyl)pyrrolidine-2,4-diones are alkylated with an alkyl sulfate, as for example, dimethyl sulfate, or an alkyl halide, such as ethyl iodide in the presence of an alcoholic alkali metal alkoxide, such as sodium methoxide in methanol at temperatures of 25°–80° C. to give the 3-lower-alkyl-5-phenyl-(or substituted phenyl)-4-alkoxy-3-pyrrolin-2-ones. This series of reactions can be illustrated as follows:

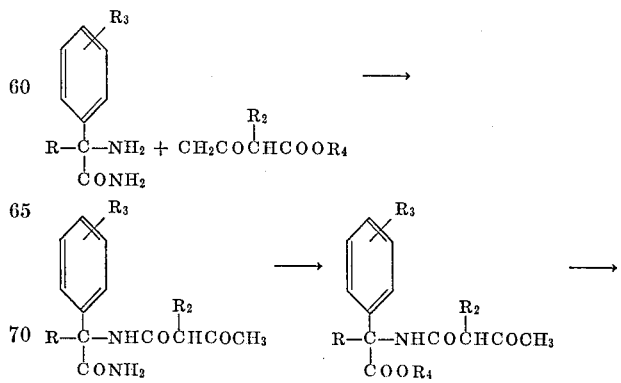

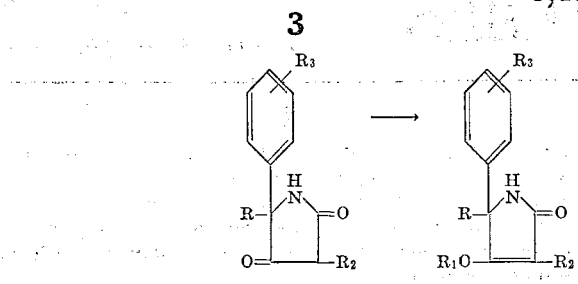

wherein R is hydrogen or lower alkyl and $R_1$, $R_2$ and $R_4$ are lower alkyl and $R_3$ is as heretofore defined.

The compounds of the present invention are physiologically active in warm-blooded animals as central nervous system depressants. This activity is indicative of uses in the field of hypnotics, tranquilizers and the like. The dosage of the compounds of this invention will depend on the route of administration, age, weight, and condition of the warm-blooded animal. A total daily dose of from about 10 mg. to about 1000 mg. given singly or in divided dosage several times daily embraces the effective range of treatment of most conditions for which the compounds are useful.

The compounds of the present invention can be used in the form of compositions preferably administered in unit dosage form such as tablets, pills, capsules, powders, granules, sterile parenteral solutions or suspensions, oral solutions or suspensions and the like. For preparing solid compositions such as tablets, the principal active ingredient is mixed with conventional tableting ingredients such as corn starch, lactose, sucrose, sorbitol, talc, stearic acid, magnesium stearate, dicalcium phosphate, gums, and fractionally similar materials as pharmaceutical diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating.

The liquid forms in which the novel compositions of the present invention may be incorporated for administration include aqueous suspensions, suitably flavored emulsions with edible oils, such as, cottonseed oil, sesame oil, coconut oil, peanut oil and the like, as well as elixirs and similar pharmaceutical vehicles. Suitable dispersing or suspending agents for aqueous suspensions include synthetic and natural gums, such as, tragacanth, acacia, algniate, dextran, sodium carboxymethylcellulose, methylcellulose, polyvinylpyrrolidone, gelatin and the like. Sterile suspensions are required for parenteral use.

The term unit dosage form as used in the specification and claims refers to physically discrete units suitable as unitary dosage for warm-blooded animal subjects, each unit containing a predetermined quantity of active material calculated to produce the desired therapeutic effect in association with the required pharmaceutical diluent, carrier or vehicle. The specifications for the novel unit dosage forms of this invention are dictated by and are directly dependent on (a) the unique characteristics of the active material and the particular therapeutic effect to be achieved, and (b) the limitations inherent in the art of compounding such an active material for therapeutic use in warm-blooded animals. Examples of suitable oral unit dosage forms in accord with this invention are tablets, capsules, pills, powder packets, granules, wafers, cachets, teaspoonfuls, dropperfuls, ampules, visals, segregated multiples of any of the foregoing, and other forms as herein described.

The following examples describe in greater detail the preparation of representative 4-alkoxy-5-phenyl-3-pyrrolin-2-ones of the present invention.

Example 1.—Preparation of 2-acetamido-2-phenylpropionamide

To a solution of 41 g. of 2-amino-2-phenylpropionamide and 25 g. of triethylamine in 1250 ml. of acetone is added slowly 19.6 g. of acetyl chloride. The mixture is stirred for 3 hours and then filtered. The filter cake is slurred in water and filtered to give 27 g. of a white solid. The acetone filtrate is evaporated to dryness and the solid residue is taken up in water and filtered to give 13 g. of a white solid. The two solids are combined and recrystallized from ethanol to give 33 g. of 2-acetamido-2-phenylpropionamide as a white solid, melting point 188°–189° C.

Example 2.—Preparation of 2-acetamido-2-phenylbutyramide

The procedure of Example 1 is repeated using 2-amino-2-phenylbutyramide in place of 2-amino-2-phenylpropionamide. The resulting 2-acetamido-2-phenylbutyramide has a melting point of 175.5°–176.° C.

Example 3.—Preparation of 2-acetamido-2-phenylvaleramide

The procedure of Example 1 is repeated using 2-amino-2-phenylvaleramide in place of 2-amino-2-phenylpropionamide. The resulting 2-acetamido-2-phenylvaleramide has a melting point of 156°–157° C.

Example 4.—Preparation of methyl 2-acetamido-2-phenylpropionate

A mixture of 30 g. of 2-acetamido-2-phenylpropionamide and 300 g. of polyphosphoric acid is warmed on a steam bath for 1 hour, and then the thick syrup is dissolved in 600 ml. of methanol. The solution is evaporated to a thick syrup and then treated with ice water. The product, which separates as a white solid, is collected. The methyl 2-acetamido-2-phenylpropionate weighs 27 g., melting point 131°–132° C.

Example 5.—Preparation of methyl 2-acetamido-2-phenylbutyrate

The procedure of Example 4 is repeated except that an equivalent molar quantity of 2-acetamido-2-phenylbutyramide is used. The product, methyl 2-acetamido-2-phenylbutyrate, is obtained as a solid, melting point 152.5°–153.5° C.

Example 6.—Preparation of methyl 2-acetamido-2-phenylvalerate

The procedure of Example 4 is repeated except that an equivalent molar quantity of 2-acetamido-2-phenylvaleramide is used. Methyl 2-acetamido-2-phenylvalerate is obtained as a white solid, melting point 107°–108° C.

Example 7.—Preparation of 5-methyl-5-phenylpyrrolidine-2,4-dione

A solution of 18.6 g. of methyl 2-acetamido-2-phenylpropionate in 125 ml. of sodium-dried toluene is treated with 9.2 g. of 54.7% sodium hydride dispersed in oil and the resulting mixture is stirred and refluxed for 4 hours. The mixture is cooled and treated first with 125 ml. of water and then with 80 ml. of 3 N hydrochloric acid and the resulting mixture is filtered to remove a small amount of solid consisting of 2-acetamido-2-phenylpropionic acid (melting point 190°–192° C.). The filtrate consisting of two layers is separated and the aqueous layer is extracted several times with portions of chloroform. The extracts are combined with the organic layer, dried, filtered, and evaporated. The solid residue (10 g.) is recrystallized from ethyl acetate, chloroform-petroleum ether or aqueous alcohol. The pure 5-methyl-5-phenylpyrrolidine-2,4-dione melts at 137–138° C.

Example 8.—Preparation of 5-ethyl-5-phenylpyrrolidine-2,4-dione

The procedure of Example 7 is repeated except that methyl 2-acetamido-2-phenylbutyrate is used. The 5-ethyl-5-phenylpyrrolidine-2,4-dione is obtained as a white solid melting at 149°–150° C.

Example 9.—Preparation of 5-propyl-5-phenylpyrrolidine-2,4-dione

The procedure of Example 7 is repeated except that methyl 2-acetamido-2-phenylvalerate is used. The 5-propyl-5-phenylpyrrolidine-2,4-dione is obtained as a white solid melting at 120°–121° C.

Example 10.—Preparation of 4-methoxy-5-methyl-5-phenyl-3-pyrrolin-2-one

A solution of 1.9 g. of 5-methyl-5-phenylpyrrolidine-2,4-dione, 10 ml. of 1 N sodium methoxide and 1.9 g. of dimethylsulfate is refluxed for 4 hours and then diluted with water. The solid which separates is collected and recrystallized from methanol or ethyl acetate to give 0.9 g. of 4-methoxy-5-methyl-5-phenyl-3-pyrrolin-2-one as a white solid, melting point 178°–182° C.

Example 11.—Preparation of 4-ethoxy-5-methyl-5-phenyl-3-pyrrolin-2-one

When the procedure of Example 10 is repeated using diethyl sulfate and sodium ethoxide, 4-ethoxy-5-methyl-5-phenyl-3-pyrrolin-2-one is obtained as a white crystalline solid, melting point 156°–157° C.

Example 12.—Preparation of 4-propoxy-5-methyl-5-phenyl-3-pyrrolin-2-one

The procedure of Example 10 is repeated except that propyl bromide is used in place of dimethyl sulfate. 4-propoxy-5-methyl-5-phenyl-3-pyrrolin-2-one is obtained as a white solid, melting point 112.5°–113.5° C.

Example 13.—Preparation of 4-methoxy-5-ethyl-5-phenyl-3-pyrrolin-2-one

Four grams of 5-ethyl-5-phenylpyrrolidine-2,4-dione, dissolved in 20 ml. of 1 N sodium methoxide in methanol is refluxed with 3.8 g. of dimethylsulfate for 4 hours. The solution is diluted with water and the solid, which separates, is collected and recrystallized from aqueous methanol to give 4-methoxy-5-ethyl-5-phenyl-3-pyrrolin-2-one, melting at 154°–155° C.

Examples 14–18.—Preparation of 4-alkoxy-5-alkyl-5-phenyl-3-pyrrolin-2-ones

The following compounds were prepared by reacting 5-ethyl-5-phenylpyrrolidine - 2,4 - dione or 5-propyl-5-phenylpyrrolidine-2,4-dione with the appropriate alkyl halide as described in Example 13 except that ethanolic sodium ethoxide is used.

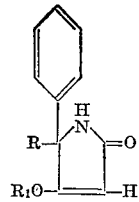

| Example No. | R | $R_1$ | M.P., ° C. |
|---|---|---|---|
| 14 | $C_2H_5$ | $C_2H_5$ | 153–155 |
| 15 | $C_2H_5$ | $C_3H_7$ | 144–145.5 |
| 16 | $C_2H_5$ | $C_4H_9$ | 112–113 |
| 17 | $C_2H_5$ | $(CH_3)_2N\,CH_2\,CH_2CH_2$ | 86–88 |
| 18 | $C_3H_7$ | $C_2H_5$ | 154.5–155.5 |

Example 19.—Preparation of 2-phenyl-2-(α-methylacetoacetamido)propionamide

A solution of 65.7 g. of 2-amino-2-phenyl-propionamide, and 63.4 g. of α-methylacetoacetic ester in 560 ml. of mesitylene is refluxed for 2 hours during which time 330 ml. of mesitylene is removed by distillation. The reaction mixture is cooled and the mesitylene is decanted from the sticky solid. The solid is crystallized from ethanol and then washed with dilute hydrochloric acid to remove unreacted aminophenylpropionamide. The solid is recrystallized from ethanol or isopropyl alcohol to give 2-phenyl-2-(α-methylacetoacetamido)propionamide melting at 152°–155° C.

Example 20.—Preparation of methyl 2-phenyl-2-(α-methylacetoacetamido)-propionate A mixture of 5.2 g. of 2-phenyl-2-(α-methylacetoacetamido)propionamide and 50 g. of polyphosphoric acid is warmed on a steam bath for 1 hour and then the hot syrup is poured slowly into 100 ml. of cold methanol. The mixture is stirred until a clear solution forms and then the excess methanol is removed by evaporation. To the resulting syrupy residue is added ice water, whereupon the product precipitates. The solid product is recrystallized from methanol and from a mixture of chloroform and petroleum ether. The recrystallized methyl-2-phenyl-2-(α-methylacetoacetamido)propionate melts at 123°–125° C.

Example 21.—Preparation of 3,5-dimethyl-5-phenyl-pyrrolidine-2,4-dione

A solution of 1 g. of methyl 2-phenyl-2-(α-methylacetoacetamido)propionate in 7.2 ml. of 1 N methanolic sodium methoxide is refluxed for 30 minutes and then evaporated to dryness. Dilute hydrochloric acid is added to the residue and the mixture is filtered. The insoluble material is recrystallized from ethanol to give 3,5-dimethyl-5-phenylpyrrolidine - 2,4 - dione, melting point 185°–187° C.

Example 22.—Preparation of 3,5-dimethyl-5-phenyl-pyrrolidine-2,4-dione

One gram of methyl 2 - phenyl - 2 - (α-methylacetoacetamido)propionate in 35 ml. of 1.5 N aqueous sodium hydroxide solution is warmed at 75–100° C. until a clear solution is obtained. The solution is cooled and acidified with aqueous hydrochloric acid and the solid 3,5-dimethyl-5-phenylpyrrolidine-2,4-dione which separates is collected and recrystallized as described in Example 21, melting point 185°–187° C.

Example 23.—Preparation of 3,5-dimethyl-4-methoxy-5-phenyl-3-pyrrolin-2-one

A 1.8 g. sample of 3,5-dimethyl-5-phenylpyrrolidine-2,4-dione is treated with 9 ml. of 1 N sodium methoxide and 1.8 g. of dimethylsulfate according to the procedure described in Example 10. The 3,5-dimethyl-4-methoxy-5-phenyl-3-pyrrolin-2-one is obtained as a white solid, melting point 180°–181° C.

Example 24.—Preparation of 3,5-dimethyl-4-ethoxy-5-phenyl-3-pyrrolin-2-one

The procedure of Example 10 is repeated except that equal molar quantities of 3,5-dimethyl-5-phenylpyrrolidine-2,4-dione, diethylsulfate and 1 N sodium ethoxide are used. 3,5-dimethyl-4-ethoxy-5-phenyl - 3 - pyrrolin-2-

Example 25.—Preparation of 2-phenyl-2-(α-ethylacetoacetamido)propionamide

When the procedure of Example 19 is repeated using α-ethylacetoacetic ester in place of α-methylacetoacetic ester, 2 - phenyl-2-(α-ethylacetoacetamido)propionamide is obtained melting at 139°–140° C.

Example 26.—Preparation of metthyl 2-phenyl-2(α-ethyl-acetoacetamido)propionate

When the procedure of Example 20 is repeated using 2-phenyl-2-(α - ethylacetoacetamido)propionamide, the product methyl 2-phenyl-2-(α-ethylacetoacetamido)propionate having a melting point of 100°–102° C. is obtained.

Example 27.—Preparation of 3-ethyl-5-phenyl-5-methyl-pyrrolidine-2,4-dione

The procedure of Example 21 is repeated except that methyl 2-phenyl-2-(α-ethylacetoacetamido)propionate is used. The 3-ethyl-5-phenyl-5-methylpyrrolidine-2,4-dione is obtained as a white solid, melting at 95°–99° C. (dec.).

Example 28.—Preparation of 3-ethyl-4-methoxy-5-methyl-5-phenyl-3-pyrrolin-2-one

The procedure of Example 10 is repeated except that 3-ethyl-5-methyl-5-phenylpyrrolidine-2,4-dione is used. The 3-ethyl-4-methoxy-5-methyl-5-phenyl-3-pyrrolin-2-one is obtained as a white solid, melting point 174°–179° C.

Example 29.—Preparation of 2-phenyl-2-(α-methylacetamido)butyramide

The procedure of Example 19 is repeated except that 71.2 g. of 2-amino-2-phenylbutyramide is used. 2-phenyl-2-(α-methylacetoacetamido)butyramide melting at 165°–166° C. is obtained.

Example 30.—Preparation of methyl 2-phenyl-2-(α-methylacetoacetamido)-butyrate

The procedure of Example 20 is repeated except that 5.6 g. of 2-phenyl-2-(α-methylacetoacetamido)butyramide is used. Methyl 2-phenyl-2-(α-methylacetoacetamido)butyrate melting at 95°–97° C. is obtained.

Example 31.—Preparation of 5-ethyl-3-methyl-5-phenyl-pyrrolidine-2,4-dione

A mixture of 4.7 g. of methyl 2-phenyl-2-(α-methylacetoacetamido)butyrate in 50 ml. of 1 N sodium hydroxide is warmed until a clear solution forms. The solution is cooled and acidified with hydrochloric acid, and the solid, which separates, is collected and recrystallized from ethanol to give 3.0 g. of 5-ethyl-3-methyl-5-phenylpyrrolidine-2,4-dione, melting point 179°–181° C. (dec.).

Example 32.—Preparation of 4-ethoxy-5-ethyl-3-methyl-5-phenyl-3-pyrrolin-2-one

A solution of 2 g. of 5 ethyl-3-methyl-5-phenylpyrrolidine-2,4-dione, 10 ml. of 1 N ethanolic sodium ethoxide and 2 ml. of ethyl iodide is refluxed for 2 hours and then evaporated to dryness. The oily residue is treated with water plus a few drops of alcohol to give a white solid. The solid is collected and recrystallized from ethanol and then from benzene to give 4-ethoxy-5-ethyl-3-methyl-5-phenyl-3-pyrrolin-2-one as a white solid melting at 168°–168.5° C.

Example 33.—Preparation of N-acetoacetyl-2-phenylglycine methyl ester

A solution of 6.4 g. of 2-phenylglycine methyl ester, 5.9 g. of diketene and 125 ml. of ether is stirred at room temperature for 5 hours. A white solid separates during this time. The mixture is filtered and is evaporated to dryness to give an additional 5 g. of a white solid. The two solids are combined and recrystallized from chloroform-petroleum ether mixture to give N-acetoacetyl-2-phenylglycine methyl ester as a white solid, melting point 85°–85.5° C.

Example 34.—Preparation of 3-acetyl-5-phenylpyrrolidine-2,4-dione

A solution of 12.5 g. of N-acetoacetyl-2-phenylglycine methyl ester and 100 ml. of 1 N methanolic sodium methoxide is refluxed for ½ hour and then evaporated to a glass. The glass is dissolved in water and the solution is acidified with 6 N hydrochloric acid to give 9.1 g. of 3-acetyl-5-phenylpyrrolidine-2,4-dione as a white solid, melting point 126°–128° C.

Example 35.—Preparation of 5-phenylpyrrolidine-2,4-dione

A mixture of 6.5 g. of 3-acetyl-5-phenyl-pyrrolidine-2,4-dione and 700 ml. of 0.1 N sulfuric acid is refluxed in an inert atmosphere, such as nitrogen, for 4½ hours and then the resulting solution is evaporated to give an oily solid residue. This residue is dissolved in chloroform, the solution is dried with magnesium sulfate, filtered and evaporated to give 3.8 g. of an oil. The oil is sublimed at 90°–100° C. at reduced pressure to give 5-phenylpyrrolidine-2,4-dione as a white solid, melting point 126°–127.5° C.

Example 36.—Preparation of 4-methoxy-5-phenyl-3-pyrrolin-2-one

The procedure of Example 13 is repeated except that 5-phenylpyrrolidine-2,4-dione is used. The 4-methoxy-5-phenyl-3-pyrrolin-2-one is obtained as a white solid, melting point 180°–185° C.

Example 37.—Preparation of 2-acetamido-2-(m-methoxyphenyl)propionamide

Following the procedure in Example 41 using 150 g. of m-methoxyacetophenone in place of p-methylacetophenone the product, 2-amino-2-(m-methoxyphenyl)propionamide is obtained as a white solid.

When the procedure in Example 1 is repeated using 2-amino-2-(m-methoxyphenyl)propionamide, there is obtained 2-acetamido-2-(m-methoxyphenyl)propionamide as as white crystalline solid.

Example 38.—Preparation of methyl 2-acetamido-2-(m-methoxyphenyl)propionate

When the procedure in Example 4 is repeated using 2-acetamido-2-(m-methoxyphenyl)propionamide there is obtained methyl 2-acetamido-2-(m-methoxyphenyl)propionate as a white solid.

Example 39.—Preparation of 5-methyl-5-(m-methoxyphenyl)pyrrolidine-2,4-dione

When the procedure in Example 7 is repeated using methy 2-acetamido-2-(m-methoxyphenyl)propionate in place of methyl 2-acetamido-2-phenylpropionate, the product 5-methyl-5-(m-methoxyphenyl)pyrrolidine-2,4-dione is obtained as a white solid which absorbs in the infrared spectrum (CHCl$_3$ solution) at 5.64 and 5.86μ.

Example 40.—Preparation of 4-methoxy-5-methyl-5-(m-methoxyphenyl)-3-pyrrolin-2-one When the procedure in Example 10 is repeated using 5-methyl-5-(m-methoxyphenyl)pyrrolidine-2,4-dione in place of 5-methyl-5-phenylpyrrolidine-2,4-dione, the product, 4-methoxy-5-methyl-5-(m-methoxyphenyl)-3-pyrrolin-2-one is obtained as a white solid with bands in the infrared spectrum at 5.93 and 6.15μ (CHCl$_3$ solution).

Example 41.—Preparation of 2-(p-tolyl)-2-(α-methylacetoacetamido)propionamide

A mixture of 52 g. of 95% sodium cyanide, 59 g. of ammonium chloride, 134 ml. of 28% ammonium hydroxide, 134 g. of p-methylacetophenone, 240 ml. of water and 300 ml. of ethanol is placed in a sealed flask and heated at 70° C. for 10 hours. The flask is cooled and the nearly black solution in the flask is removed and concentrated to about ⅓ the volume. This solution is extracted several times with portions of ether, and then the ether extracts are combined and treated with magnesium sulfate and charcoal. The mixture is filtered and the filtrate is saturated with gaseous hydrogen chloride to precipitate the 2-amino-2-(p-tolyl)propionitrile hydrochloride as a nearly white solid. This solid is added to 600 ml. of fuming hydrochloric acid and the resulting mixture is allowed to stand at room temperature for about 16 hours and then concentrated at reduced pressure at 50° to a volume of about 50 ml. To this is added 250 ml. of acetone and concentration is continued until a syrupy-solid is obtained. This sticky solid is dissolved in water and the solution is made alkaline with ammonium hydroxide. The product 2-amino-2-(p-tolyl)propionamide precipitates as a nearly white solid. The product can be recrystallized from an organic solvent such as alcohol or benzene or purified by solution in acid and reprecipitation with ammonium hydroxide. After purification, the product is obtained as a white solid.

Following the procedure of Example 19 using 2-amino-2-(p-tolyl)propionamide prepared above in place of 2-amino-2-phenylpropionamide, the product 2-(p-tolyl)-2-(α-methylacetoacetamido)propionamide is obtained as a white solid which gives a deep green color with ferric chloride solution.

Example 42.—Preparation of methyl-2-(p-tolyl)-2-(α-methylacetoacetamido)-propionate Following the procedure in Example 20 using 2-(p-tolyl)-2-(α-methylacetoacetamido)propionamide in place of 2-phenyl-2-(α-methylacetoacetamide)propionamide the product, methyl-2-(p-tolyl)-2-(α-methylacetoacetamido)-propionate is obtained as a white solid which gives a green color with ferric chloride solution.

Example 43.—Preparation of 3,5-dimethyl-5-(p-tolyl)pyrrolidine-2,4-dione

Following the procedure in Example 21 using 2-(p-tolyl)-2-(α-methylacetoacetamido)propionate in place of 2-phenyl-2-(α-methylacetoacetamido)propionate, the product 3,5-dimethyl-5-(p-tolyl)pyrrolidine-2,4-dione is obtained as a white solid.

Example 44.—Preparation of 3,5-dimethyl-4-methoxy-5-(p-tolyl)-3-pyrrolin-2-one

Following the procedure in Example 23 using 3,5-dimethyl-5-(p-tolyl)pyrrolidine-2,4-dione in place of 3,5-dimethyl-5-phenylpyrrolidine-2,4-dione, the product 3,5-dimethyl-4-methoxy-5-(p-tolyl)-3-pyrrolin-2-one is obtained as a white solid which shows bands in the infrared spectrum at 5.93 and 6.03μ (CHCl₃ solution).

Example 45.—Preparation of 2-acetamido-2-(m-trifluoromethylphenyl)propionamide

Following the procedure in Example 41 using 188 g. of m-trifluoromethylacetophenone in place of p-methylacetophenone the product, 2-amino-2-(m-trifluoromethylphenyl)propionamide is obtained as a white solid.

When the procedure in Example 1 is repeated using 2-amino-2-(m-trifluoromethylphenyl)propionamide, 2-acetamido-2-(m-trifluoromethylphenyl)propionamide is obtained as a white solid.

Example 46.—Preparation of methyl 2-acetamido-2-(m-trifluoromethylphenyl)propionate When the procedure in Example 4 is repeated using 2-acetamido-2-(m-trifluoromethylphenyl)propionamide there is obtained methyl 2-acetamido-2-(m-trifluoromethylphenyl)propionate as a white solid.

Example 47.—Preparation of 5-methyl-5-(m-trifluoromethylphenyl)pyrrolidine-2,4-dione When the procedure in Example 7 is repeated using methyl 2-acetamido-2-(m-trifluoromethylphenyl)propionate in place of methyl 2-acetamido-2-phenyl-propionate, the product 5-methyl-5-(m-trifluoromethylphenyl)pyrrolidine-2,4-dione is obtained as a white solid with bands in the infrared spectrum at 5.63 and 5.85μ.

Example 48.—Preparation of 4-methoxy-5-methyl-5-(m-trifluoromethylphenyl)-3-pyrrolin-2-one When the procedure of Example 10 is repeated using 5-methyl-5-(m-trifluoromethyl)pyrrolidine-2,4-dione in place of 5-methyl-5-phenylpyrrolidine-2,4-dione the product 4-methoxy-5-methyl-5-(m-trifluoromethylphenyl)-3-pyrrolin-2-one is obtained as a white solid which absorbs in the infra-red spectrum at 5.93 and 6.16μ (CHCl₃ solution).

Example 49.—Preparation of 2-acetamido-2-(p-chlorophenyl)propionamide

Following the procedure in Example 41 using 154.5 g. of p-chloroacetophenone in place of p-methylacetophenone the product, 2-amino-2-(p-chlorophenyl)propionamide is obtained as a white solid.

Following the procedure in Example 1 and using 2-amino-2-(p-chlorophenyl)propionamide in place of 2-amino-2-phenylpropionamide, the product 2-acetamido-2-(p-chlorophenyl)-propionamide is obtained as a white solid.

Example 50.—Preparation of methyl-2-acetamido-2-(p-chlorophenyl)propionate

Following the procedure in Example 4 and using 2-acetamido-2-(p-chlorophenyl)propionamide in place of 2-acetamido-2-phenylpropionamide, the product methyl-2-acetamido-2-(p-chlorophenyl)propionate is obtained as a white solid.

Example 51.—Preparation of 5-methyl-5-(p-chlorophenyl)pyrrolidine-2,4-dione

Following the procedure in Example 7 and using methyl 2-acetamido-2-(p-chlorophenyl)propionate in place of methyl 2-acetamido-2-phenyl-propionate the product, 5-methyl-5-(p-chlorophenyl)pyrrolidine-2,4-dione is obtained as a white solid, with bands in the infrared (CHCl₃) at 5.64 and 5.86μ.

Example 52.—Preparation of 4-ethoxy-5-methyl-5-(p-chlorophenyl)-3-pyrrolin-2-one Following the procedure in Example 11 using 5-methyl-5-(p-chlorophenyl)pyrrolidine-2,4-dione in place of 5-methyl-5-phenylpyrrolidine-2,4-dione, the product 4-ethoxy-5-methyl-5-(p-chlorophenyl)-3-pyrrolin-2-one is obtained as a white crystalline solid with bands in the infrared spectrum at 5.93 and 6.15μ (CHCl₃ solution).

We claim:
1. A compound of the formula:

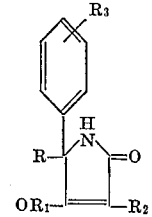

wherein R and $R_2$ are selected from the group consisting of hydrogen and methyl, and $R_1$ is selected from the group consisting of lower alkyl and di(lower)alkylamino (lower)alkyl, and $R_3$ is selected from the group consisting of hydrogen, and lower alkyl.

2. The compound 4-methoxy-5-methyl-5-phenyl-3-pyrrolin-2-one.

3. The compound 4-ethoxy-5-methyl-5-phenyl-3-pyrrolin-2-one.

4. The compound 4-propoxy-5-methyl-5-phenyl-3-pyrrolin-2-one.

5. The compound 4-methoxy-5-ethyl-5-phenyl-3-pyrrolin-2-one.

6. The compound 4-ethoxy-5-ethyl-5-phenyl-3-pyrrolin-2-one.

7. The compound 4-butoxy-5-ethyl-5-phenyl-3-pyrrolin-2-one.

8. The compound 3,5-dimethyl-4-methoxy-5-phenyl-3-pyrrolin-2-one.

9. The compound 3,5-dimethyl-4-ethoxy-5-phenyl-3-pyrrolin-2-one.

10. The compound 3-ethyl-4-methoxy-5-methyl-5-phenyl-3-pyrrolin-2-one.

11. A method of preparing compounds of the formula:

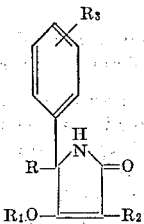

wherein R and $R_2$ are selected from the group consisting of hydrogen and lower alkyl, and $R_1$ is selected from the group consisting of lower alkyl and di(lower)alkylamino(lower)alkyl and $R_3$ is selected from the group consisting of hydrogen, and lower alkyl, which comprises reacting a compound of the formula:

in which R, $R_2$ and $R_3$ are as defined above, with an alkylating agent selected from the group consisting of lower alkyl sulfates and lower alkyl halides at a temperature within the range of from about 25° to 80° C. until a substantial amount of product is obtained and recovering said product therefrom.

References Cited

UNITED STATES PATENTS 3,272,842  6/1965  Easton et al. _____ 260—326.5
1,915,334  6/1933  Salzberg et al. _____ 260—243
2,075,359  3/1937  Salzberg et al. _____ 167—22

NICHOLAS S. RIZZO, *Primary Examiner.*

JOSE TOVAR, *Assistant Examiner.*